United States Patent [19]

Chen et al.

[11] Patent Number: 5,292,441
[45] Date of Patent: Mar. 8, 1994

[54] QUATERNIZED POLYVINYLAMINE WATER CLARIFICATION AGENTS

[75] Inventors: Jen-Chi Chen, Morrisville; Stephen R. Vasconcellos, Doylestown; Gerald C. Walterick, Jr., Levittown; Fu Chen, Newtown, all of Pa.

[73] Assignee: Betz Laboratories, Inc., Trevose, Pa.

[21] Appl. No.: 3,186

[22] Filed: Jan. 12, 1993

[51] Int. Cl.$^5$ ............................................. C02F 1/56
[52] U.S. Cl. ................................. 210/735; 210/736; 210/917
[58] Field of Search ............... 210/725, 727, 728, 735, 210/736, 917

[56] References Cited

U.S. PATENT DOCUMENTS

| | | | |
|---|---|---|---|
| 3,715,336 | 2/1973 | Nowak et al. | 210/734 |
| 4,053,512 | 10/1977 | Panzer et al. | 210/735 |
| 4,102,827 | 7/1978 | Rembaum et al. | 210/736 |
| 4,217,214 | 8/1980 | Dubin | 210/52 |
| 4,808,683 | 2/1989 | Itagaki et al. | 526/307.2 |
| 4,957,977 | 9/1990 | Itagaki et al. | 525/328.4 |

OTHER PUBLICATIONS

Betz Handbook of Industrial Water Conditioning, 9th ed. 1991; pp. 23–30.

*Primary Examiner*—Peter A. Hruskoci
*Attorney, Agent, or Firm*—Alexander D. Ricci; Steven D. Boyd

[57] ABSTRACT

The use of quaternized polyvinylamines for use in water clarification is disclosed.

6 Claims, No Drawings

QUATERNIZED POLYVINYLAMINE WATER CLARIFICATION AGENTS

FIELD OF THE INVENTION

The present invention relates to the Use of quaternized polyvinylamines for water clarification. More particularly, the present invention relates to the use of quaternized polyvinylamines for the flocculation of suspended solids in water purification or wastewater clarification systems.

BACKGROUND OF THE INVENTION

The present invention relates to the clarification of raw water for use in the industrial or domestic applications, or the clarification of wastewater for reuse or disposal. Raw water such as from rivers, lakes, or underground usually contains suspended matter. The suspended matter must be removed by clarification in order to provide water suitable for use in domestic and industrial applications. The suspended matter can consist of large solids, settleable by gravity alone without any external aid and non-settleable material, often colloidal in nature.

Removal of nonsettleable material is generally accomplished by coagulation, flocculation, and sedimentation. In combination, these three processes are referred to as conventional clarification. See the Betz Handbook of Industrial Water Conditioning, 9th edition, 1991, Betz Laboratories, Inc., Trevose, Pa., pages 23 through 30.

Coagulation is the process of destabilization by charge neutralization. Once neutralized, particles no longer repel each other and can be brought together. Coagulation is necessary for removal of the colloidal sized suspended matter. Flocculation is the process of bringing together of the destabilized, or "coagulated" particles to form a larger agglomeration or floc. Sedimentation, or settling, refers to the physical removal of particles from suspension that occurs once the particles have been coagulated and flocculated. Sedimentation alone, without prior coagulation results in the removal of only relatively coarse suspended solids.

Naturally occurring suspended particles are predominantly negatively charged. Polyelectrolytes are traditionally used for influent and wastewater clarification. For low turbidity waters, inorganic polyelectrolytes, such as alum, or organic polyelectrolytes, such as melamine formaldehydes are traditionally employed. For higher turbidity waters, high charge cationic polyelectrolytes such as polyamines formed by the condensation reaction of epichlorohydrin and dimethylamine can be used. High turbidity waters are generally considered those having a greater than 60 NTU (Nepholometric Turbidity Units). In low turbidity waters, those with less than 60 NTU, there are generally not enough particles to form a settleable floc when the water is treated with cationic polymers alone. Inorganic coagulants such as alum, aluminum sulfate, polyaluminum chloride, ferric sulfate, ferric chloride, sodium aluminate and melamine formaldehydes are used either alone or in combination with high charge cationic polyelectrolytes.

The use of inorganic coagulants tends to generate voluminous sludges which are difficult to dewater. Also, such inorganic coagulants are only effective within a particular pH range and therefore require proper pH adjustment of the water during treatment. In addition, the increase of iron and aluminum ions in the treated water from the inorganic coagulants may affect downstream operations such as cooling and boiler treatments and may also cause health and environmental concerns when the water is finally discharged. Similarly, the use of melamine formaldehyde resins can result in residual formaldehyde in the resin causing handling and disposal difficulties.

It is an object of the present invention to provide methods for clarifying water which are more effective than the use of alum, melamine formaldehyde or the reaction product of epichlorohydrin and dimethylamine.

The use of vinylamine copolymers for flocculation in water treatment is known. U.S. Pat. No. 4,217,214 discloses the use of high molecular weight polyvinylamine hydrochloride as a flocculating agent in water treating systems. Polyvinylamine hydrochloride is an ethenamine hydrochloride homopolymer, CAS Registry No. 29792-49-2.

U.S. Pat. No. 4,808,683 discloses the use of a mixture of a vinylamine copolymers of the formula disclosed therein as a flocculating agent, drainage aid and paper strength increasing agent.

U.S. Pat. No. 4,957,977 discloses the use of a mixture of vinylamine copolymers of the formula disclosed therein as a flocculating agent and a paper strength increasing agent.

SUMMARY OF THE INVENTION

The present invention is directed to a method of clarifying water which employs quaternized polyvinylamines. Quaternary polyvinylamines are obtained from the reaction of a polyvinylamine with a quaternizing agent such as methyl (ethyl) chloride, dimethyl (ethyl) sulfate or benzyl chloride.

The quaternized polyvinylamines of the present invention were found to provide improved clarification of raw water. The quaternized polyvinylamines are effective in amounts which vary depending upon the particular system being treated. The treatment levels can vary from about 0.1 to 100 parts per million parts of water depending upon factors such as: turbidity, pH, temperature, water quantity, and respective contaminants in the water.

DESCRIPTION OF THE PREFERRED EMBODIMENTS

The present invention relates to a method of clarifying water. The method of the present invention comprises treating the water to be clarified with a quaternized polyvinylamine in an amount effective for the purpose of reducing turbidity.

The quaternized polyvinylamine employed in the present invention is preferably prepared from a polyvinylamine hydrochloride. Polyvinylamine hydrochloride can be prepared by polymerizing N-vinylformamide or N-vinyl acetamide which is then hydrolyzed and converted to the desired amine salts by contacting with an appropriate mineral acid.

These amine salts of the general formula

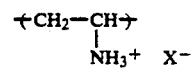

where $X^-$ is a water soluble anion such as Cl, are thereafter quaternized to form the quaternized polyvinylamines employed in the present invention of the general formula

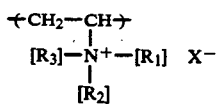

wherein $R_1$, $R_2$, and $R_3$ can be, independently, methyl, ethyl or benzyl and $X^-$ is a water soluble anion such as: Cl, Br, I, or $CH_3SO_4$. The molecular weight of the polyvinylamine can range from about 1,000 to about 1 million, and is preferably from about 10,000 to 500,000.

Regardless of the method of formation of a polyvinylamine hydrochloride, the critical reaction for forming the material employed in the present invention is the quaternization reaction. Quaternized polyvinylamine is preferably formed by reacting the polyvinylamine or polyvinylamine hydrochloride with a quaternizing agent such as methyl chloride, dimethyl sulfate or benzyl chloride with aqueous sodium hydroxide as shown in Formula I.

FORMULA I

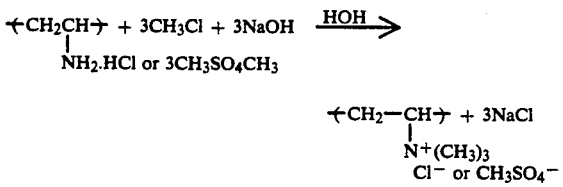

The resulting polymer solution is preferably concentrated and dialyzed to remove the salts. The extent or degree of quaternization can be substantiated by C-13 and N-15 NMR spectroscopy and conventional colloid titration. The titration measures the degree of quaternization (cationicity) as expressed in milliequivalents per gram of material (meq/g) using potassium polyvinyl sulfate solution as titrant and toluidine blue as indicator.

While specific methods of preparing quaternary polyvinylamines for use in the present invention have been described they are not intended to be limiting. These described methods are only exemplary methods of preparing the quaternized polyvinylamine used in the method of the present invention. Alternate means of preparing quaternary polyvinylamine may be employed to form the material used in the method of the present invention.

The following experimental procedures were employed to prepare the materials tested in the Examples.

Synthesis of poly N-vinylformamide: A monomer solution containing 40.0 grams of N-vinylformamide (Air Products) and 220.5 grams of deionized water was charged to a reaction flask. The solution was slowly heated to 600° C. under a nitrogen atmosphere. An initiator solution containing 1.2 grams of V-50 (2,2' azobis (2-amidinopropane)-dihydrochloride available from Wako Chemicals) was added to the solution. The solution was held at 600° C. for 7 hours and cooled. The resulting polymer was verified as poly-N-vinylformamide by C-13 NMR.

Preparation of Polyvinylamine (Polymer A): A polymer solution of 87.7 grams of poly N-vinylformamide and 26.4 grams of concentrated hydrochloric acid was charged into a reaction flask. The solution was heated to 1000C and held for six hours. The resulting polymer solution was transferred to a cellulose tubing (MWCO-1000) and was dialyzed against fresh deionized water. The resulting polymer solution had a Brookfield viscosity of 9.1 cps at 2.0% solids.

Quaternization of Polyvinylamine (Polymer B): A polymer solution containing 52.1 grams of the polyvinylamine solution (Polymer A, 4.8% solids), 13.8 grams of isopropanol, 14.5 grams of 50% sodium hydroxide and 16.7 grams of deionized water was charged into a 450 ml pressure reactor. The reaction vessel was cooled by a dry-ice/isopropanol bath and was then charged with 12.5 grams of methyl chloride. The reactor was heated to 800° C. and held for 5 hours. The resulting polymer solution was concentrated and dialyzed against fresh deionized water. The structure of the polymer was verified by C-13 NMR. The polymer solution had a Brookfield viscosity of 5.5 cps at 2.0% solids (250° C.).

Quaternization of Polyvinylamine (Polymer C): a polymer solution containing 7.5 g of polyvinylamine hydrochloride (Air Products, medium MW) was reacted with 17.8 grams of methyl chloride in the same procedure described above. The resulting quaternized polymer had a Brookfield Viscosity of 9.3 cps at 2.0% solids (250° C.).

Quaternization of Polyvinylamine (Polymer D): a polyvinylamine solution (Air Products, low MW) was reacted with methyl chloride in the same procedure described above. The resulting quaternized polymer had a Brookfield viscosity of 4.0 cps at 2.0% solids (250° C.).

Quaternization of Polyvinylamine (Polymer E): The polymer was prepared from N-vinyl formamide and quaternized with methyl chloride at 650° C. by the procedure described above. The resulting polymer had a Brookfield viscosity of 13.5 cps at 2.0% solids (250° C.).

Table 1 summarized the cationicity of the quaternized polyvinylamines tested in the following examples. Cationicity of the quaternized polyvinylamines tested in the following examples. Cationicity is an indication of the degree of quaternization of the material.

TABLE I

| Polymer | Cationicity (meq/gram) |
|---------|------------------------|
| C       | 7.2                    |
| B       | 8.0                    |
| D       | 7.4                    |
| E       | 7.5                    |

The present invention will now be further described with reference to a number of specific example% which are intended to be illustrative and not as restricting the scope of the present invention.

Efficacy testing of quaternary polyvinylamine polymers in accordance with the present invention in direct comparison to polyvinylamine hydrochloride and other commercial water clarification additives was undertaken.

EXAMPLE 1

The materials to be tested were added to a test substrate comprising a low turbidity synthetic river water. The synthetic river water was prepared from distilled water, reagent grade chemicals and naturally occurring clays and humic acid. The test substrate was prepared to have the following properties:
turbidity = 8 NTU;
total suspended solids = 30 mg/liter;
true colbr = 25 Pt-Co color units;
Ca = 40 ppm as CaCO3;
Mg = 20 ppm as CaCO3;
Methyl orange alkalinity = 50 ppm as CaCO3;
pH = 7.0.

The test procedure was chosen to simulate the operation of a typical water treatment clarifier. The comparative products included aluminum sulfate and a melamine formaldehyde polymer which are treatments commonly used in low turbidity river water clarification.

The test procedure comprised placing 500 ml of synthetic river water into a 600 ml beaker and mixing at 100 rpm using a one inch by three inch stirrer paddle. The polymer to be tested was added in the dosage indicated (all dosages are expressed as parts per million active polymer). After polymer addition, the samples were mixed for 15 seconds at 100 rpm, 100 minutes at 60 rpm, 5 minutes at 35 rpm and 5 minutes at 20 rpm. The mixing was stopped and the sample allowed to settle 15 minutes. A 30 ml sample of supernatant water was siphoned from a point 1 inch below the surface of the settled water. The turbidity of the sample was measured using a Hach Model 18900 ratio turbidity meter.

The results of the testing are summarized in Table 2. The results show that the quaternized polyvinylamines are more effective at reducing turbidity than the polyvinylamine and commercial materials at low treatment levels.

TABLE 2

| Polymer | Polymer Dosage (ppm active) | Supernatant Turbidity (ntu) |
|---|---|---|
| B | 0.2 | 0.8 |
|  | 0.5 | 0.3 |
|  | 1.0 | 2.9 |
|  | 1.5 | 7.1 |
|  | 2.0 | 6.6 |
|  | 4.0 | 6.7 |
| C | 0.2 | 3.8 |
|  | 0.5 | 0.3 |
|  | 1.0 | 0.4 |
|  | 1.5 | 3.0 |
|  | 2.0 | 6.5 |
|  | 4.0 | 6.4 |
| E | 0.2 | 2.4 |
|  | 0.5 | 0.3 |
|  | 1.0 | 0.5 |
|  | 2.0 | 6.0 |
|  | 3.0 | 6.7 |
| D | 0.2 | 2.3 |
|  | 0.5 | 0.3 |
|  | 1.0 | 0.3 |
|  | 2.0 | 6.5 |
|  | 3.0 | 7.2 |
| PVAM-HCL low m.w. | 0.5 | 1.3 |
|  | 1.0 | 0.2 |
|  | 1.5 | 0.3 |
|  | 2.0 | 0.5 |
|  | 3.0 | 1.4 |
|  | 4.0 | 3.2 |
| PVAM-HCL med. m.w. | 0.5 | 2.8 |
|  | 1.0 | 0.3 |
|  | 1.5 | 0.3 |
|  | 2.0 | 0.5 |
|  | 3.0 | 2.2 |
| Melamine formaldehyde polymer | 4.0 | 1.6 |
|  | 6.0 | 1.8 |
|  | 8.0 | 1.0 |
|  | 10.0 | 1.5 |
|  | 12.0 | 1.7 |
| Alum | 8.6 | 0.4 |
|  | 11.5 | 0.3 |
|  | 14.4 | 0.2 |
|  | 17.3 | 0.3 |
|  | 20.1 | 0.3 |

EXAMPLE 2

Efficacy testing of the quaternary polyvinylamine polymers of the present invention in comparison to polyvinylamine hydrochloride and other commercial water clarification additives for high turbidity water were undertaken. The test substrate comprised a synthetic high turbidity, high color river water. The test substrate was prepared from distilled water, reagent grade chemicals and naturally occurring clays and humic acid. The test substrate was prepared to have the following properties:
turbidity = 73 NTU;
total suspended solids = 300 mg/liter;
true color25 Pt-Co color units;
Ca = 20 ppm as CACO
Mg = 10 ppm as CaCO3;
Methyl orange alkalinity 50 ppm as CaCO3;
pH = 7.0.

The test procedure was as described above in Example 1. The results of the testing are summarized in Table 3. The results show that the quaternized polyvinylamines of the present invention are more effective at reducing turbidity than the polyvinylamine and commercial materials at low treatment levels.

TABLE 3

| Polymer | Polymer Dosage (ppm active) | Supernatant Turbidity (ntu) | Supernatant True Color (Pt-Co color units) |
|---|---|---|---|
| B | 2.0 | 35.0 | 43 |
|  | 4.0 | 2.2 | 25 |
|  | 6.0 | 0.5 | 13 |
|  | 8.0 | 1.9 | 9 |
| C | 4.0 | 25.0 | 48 |
|  | 5.0 | 8.5 | 34 |
|  | 6.0 | 1.1 | 25 |
|  | 8.0 | 0.1 | 17 |
| E | 4.0 | 26.0 | 41 |
|  | 5.0 | 4.2 | 23 |
|  | 6.0 | 0.8 | 18 |
|  | 8.0 | 0.1 | 10 |
| D | 4.0 | 23.0 | 53 |
|  | 5.0 | 4.8 | 35 |
|  | 6.0 | 0.9 | 27 |
|  | 8.0 | 0.4 | 19 |
| PVAM-HCL low m.w. | 4.0 | 59.0 | 100 |
|  | 8.0 | 3.1 | 11 |
|  | 10.0 | 0.6 | 6 |
|  | 12.0 | 0.6 | 5 |
| PVAM-HCL med. m.w. | 4.0 | 53.0 | 119 |
|  | 8.0 | 2.1 | 10 |
|  | 10.0 | 0.2 | 6 |
|  | 12.0 | 0.3 | 6 |
| Epichlorohydrin/ dimethylamine polymer | 2.0 | 58.0 | 93 |
|  | 4.0 | 40.0 | 41 |
|  | 6.0 | 13.5 | 27 |
|  | 8.0 | 1.8 | 19 |
|  | 10.0 | 0.8 | 11 |
|  | 12.0 | 1.0 | 7 |
|  | 14.0 | 1.0 | 5 |
|  | 16.0 | 1.2 | 5 |
|  | 18.0 | 3.4 | 3 |
|  | 20.0 | 18.0 | 4 |

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method of reducing the turbidity of an aqueous system containing suspended solids comprising adding to the aqueous system an amount effective for the purpose of flocculating the suspended solids and reducing turbidity of a quaternary polyvinylamine of the general formula:

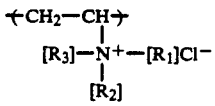

wherein $R_1$, $R_2$, and $R_3$ are, independently, methyl, ethyl or benzyl and wherein $X^-$ is a water soluble anion and removing the flocculated suspended solids from the aqueous system.

2. The method of claim 1 wherein $X^-$ is a water soluble anion selected from the group consisting of Cl, Br, I and $CH_3SO_4$.

3. The method of claim 1 wherein said polyvinylamine has a molecular weight of from about 1,000 to about 1 million.

4. A method of reducing the turbidity of an aqueous system containing suspended solids comprising adding to the aqueous system an amount effective for the purpose of flocculating the suspended solids and reducing turbidity of a quaternary polyvinylamine of the general formula:

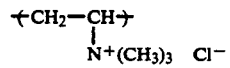

and removing the flocculated suspended solids from the aqueous system.

5. The method of claim 4 wherein said polyvinylamine has a molecular weight of from about 1,000 to about 1 million.

6. The method of claim 4 wherein said polyvinylamine has a molecular weight of from about 10,000 to about 500,000.

* * * * *